Dec. 29, 1964     G. VANSTEENKISTE     3,163,801
DEVICE FOR DETECTING SHORTED SEMI-CONDUCTOR CELLS IN RECTIFIERS
Filed Aug. 1, 1962
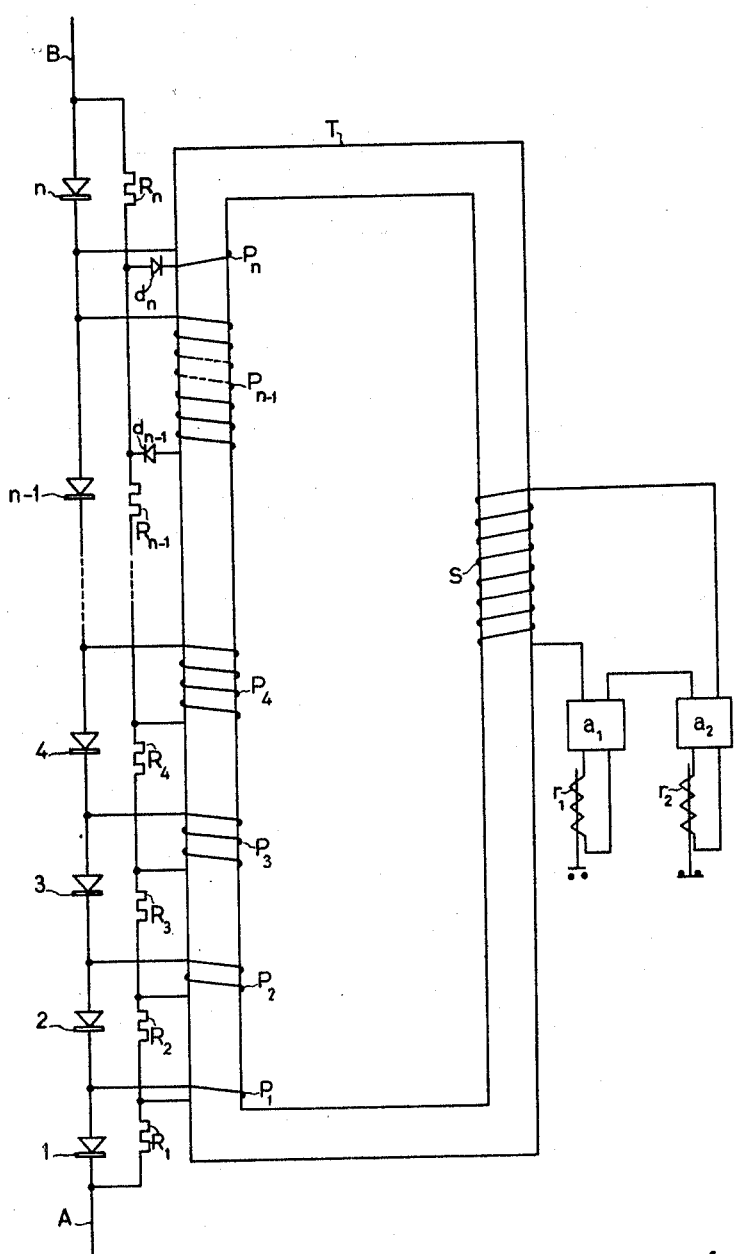
Inventor:
G. VANSTEENKISTE
attorneys

3,163,801
DEVICE FOR DETECTING SHORTED SEMI-CONDUCTOR CELLS IN RECTIFIERS

Georges Vansteenkiste, Mons, Belgium, assignor to Ateliers de Constructions Electriques de Charleroi (ACEC), Brussels, Belgium
Filed Aug. 1, 1962, Ser. No. 214,109
1 Claim. (Cl. 317—14)

The instant invention relates to the detection of shorted cells in rectifiers wherein several semiconductor cells are mounted in series. Regardless of the type of coupling of the rectifier, it is obvious that if a cell is shorted in a line that contains several of them in series, the inverse voltage is carried by the remaining cells and the smaller the total number of cells in series, the more affected they become. It is, therefore, important to be warned that a cell is shorted and even, in certain cases, insure that the installation automatically goes out of service. In the case where the number of series cells in one line is relatively high, it would be interesting that an alarm signal be sounded even if only one cell is shorted, with due allowance for the safety margin. In this manner, the installation may temporarily remain in service until the time is suitable for making the repair. However, if a second cell should happen to be shorted, it would generally be advisable to immediately cut off the feeding of the rectifier.

The present invention is adapted to satisfy these requirements: it relates to a device which actuates a relay when any cell in one line of a rectifier is shorted, the line comprising several cells connected in series. This device will actuate a second relay should a second cell be shorted and both serve, respectively, to actuate a signaling system and to disconnect the installation.

The invention is characterized in that each line having cells mounted in series is shunted by a chain of equal resistances also in series and equal in number to that of the cells, the successive connecting points of the cells being joined to the corresponding connecting points of the resistances through separate primary windings of a transformer, the windings all being wound in the same direction and having their number of turns increasing in arithmetical progression from one end of the line to the other and the device further including a supplementary winding having the same number of turns as that of the first winding, but wound in opposite direction, this supplementary winding being in parallel with the last winding of the series but these two windings being in series each with a diode so that a current cannot flow simultaneously in both windings and that, in the case of the shorting of the last cell, the current flowing in the series of resistances, due to the inverse voltage, flows through the supplementary winding. The said transformer is, on the other hand, provided with a secondary winding, the current of which through appropriate eventual amplifiers, acts on two relays having different threshold operating characteristics in such a way that one operates in the case of the short-circuiting of one cell while the other operates in the case of the short-circuiting of two cells.

The invention will be better understood by reference to the following description and to the appended drawing which is an electrical diagram of a non-limitative embodiment of the invention.

The diagram illustrates a branch of a rectifier circuit comprises a certain number of cells connected in series and identified respectively by numerals 1, 2, 3, 4 ... n—1, n. This branch is shunted by a chain of equal resistances R1, R2, R3, R4 ... Rn—1, Rn connected in series and adapted to evenly distribute the inverse voltage between the cells; the connecting points of these resistances being respectively connected to the connecting points of the cells through primary windings P1, P2, P3, P4 ... Pn—1, Pn of a current transformer T.

Winding P1 has a certain number $x$ of turns and the other windings respectively have:

$P2 = 2x$ turns
$P3 = 3x$ turns
$P4 = 4x$ turns
$Pn-1 = (n-1)x$ turns
$Pn = x$ turns The windings P1 to Pn—1 have their lead-in ends connected respectively to the common point of resistances R1 and R2 ... Rn—1 and Rn, whereas their lead-out ends are connected respectively to the common point of cells 1 and 2, 2 and 3, 3 and 4 ... n—1 and n. They are all wound in the same direction. With regard to winding Pn, it is wound in the opposite direction and its lead-in and lead-out ends are connected to the same points as the lead-in and lead-out ends of winding Pn—1; however, the latter two windings are in series with diodes $dn$ and $dn-1$, having opposite directions of flow.

During their conduction period, cells 1 to $n$ act as short circuits and no current flows in the windings P1 to Pn. During the non-conduction period, the inverse voltage appears across the ends A and B of the branch and the cells 1 to $n$ being considered as sound, a current $i$ flows in the series resistances R1 to Rn but no current is shunted in the windings P1 to Pn.

If cell 1 is shorted, it acts, during the inversed period, as a short circuit and it is easy to see that a current from point A flows through cell 1, winding P1 and resistances R2, R3 ... Rn to end up at point B. This current is greater than current $i$ defined above since resistance R1 is short circuited by winding P1 in series with this cell 1 and this current equals $$i\frac{n}{n-1}$$

The magnetomotive force created by winding P1 in the magnetic circuit of the transformer T thus equals $$xi\frac{n}{n-1}$$

If, instead of cell I, any other cell between 2 and n—2 is shorted, for instance cell 4, it can easily be seen that during the inverse period a current leaving from A flows through resistances R1, R2, R3, winding P3, cell 4, winding P4 in opposite direction to that in P3 and the next resistances until Rn to end up at point B. Here again, the current equals $$i\frac{n}{n-1}$$

and the magnetomotive force equals $$(4x-3x)i\frac{n}{n-1}=xi\frac{n}{n-1}$$

It is obvious that this result will be identical regardless of which of the cells comprised between 2 and n—2 is shunted since the current is the same and flows successively through two opposed windings the number of turns of which is different by the value $x$.

If cell n—1 is shorted, the same reasoning applies since the direction of conduction in diode $dn-1$ corresponds to the direction of the current which flows through winding Pn—1 after having flown through the preceding winding Pn—2 and this current cannot flow through winding Pn because of the presence of diode $dn$. The result is therefore the same, that is, the magnetomotive force is always $$xi\frac{n}{n-1}$$

Finally, if cell $n$ is shorted, the current that starts from point A will successively flow through resistances R1, R2 ... R$n$—1, will not be able to go through winding P$n$—1 because of the diode $dn$—1 but will go through winding P$n$ only in the desired direction to create the magnetomotive force $$xi\frac{n}{n-1}$$

in the same direction as in the preceding cases.

It is important that this direction be the same, as will be seen hereinafter, when another cell from 1 to $n$—2 becomes shorted.

Whatever cell be shorted, there will always be a magnetomotive force of the same amplitude and of the same direction. This force creates a current in the secondary winding S of transformer T which actuates a relay $r1$ through the medium of an amplifier $a1$ of low input impedance, for instance, a transistor or magnetic amplifier.

The input of amplifier $a1$ is in series with that of a second amplifier $a2$ the purpose of which will appear hereinafter. This second amplifier $a2$ actuates a relay $r2$.

Now, if a second cell should become shorted, several cases may be considered:

(1) The two shorted cells are not next to one another.

It is easy to see that, in such a case, since two resistances of the chain R1, R2 ... R$n$ are short-circuited, the current therein will be, during the inverse period:

$$i\frac{n}{n-2}$$

and that, the effects being cumulative, the magnetomotive force will be $$2xi\frac{n}{n-2}$$

therefore more than twice that which corresponds to the shorting of only one cell.

(2) The two shorted cells are next to one another but are not 1 and 2 nor $n$—1 and $n$.

For instance, this would be the case with cells 3 and 4. It can be seen that, during the inverse period, the current which starts from point A flows successively through resistances R1 and R2, winding P2, shorted cells 3 and 4, winding P4, then resistances R5 ... R$n$ to finally end up at point B. Again, the current is $$i\frac{n}{n-2}$$

and the magnetomotive force is $$(4x-2x)i\frac{n}{n-2}=2xi\frac{n}{n-2}$$

therefore the same one as in the preceding case.

It is obvious that when two other neighbouring cells are involved, the result is identical since the current is the same and flows through two opposed windings which differ from one another by $2x$ turns.

(3) The two shorted cells are cells 1 and 2.

In such a case, the winding P2 is the only one traveled by the current $$i\frac{n}{n-2}$$

and the magnetomotive force remains:

$$2xi\frac{n}{n-2}$$

(4) The two shorted cells are cells $n$—1 and $n$.

The current is always $$i\frac{n}{n-2}$$

but it travels through winding P$n$—2 only so that the magnetomotive force equals $$-(n-2)xi\frac{n}{n-2}=-xin$$

Since it is interesting to cause tripping of the installation, when two cells are shorted, only if a branch has at least four such cells in series (otherwise tripping should be made to happen as soon as only one cell is shorted), it is seen that the magnetomotive force is at least equal to that of the preceding cases and, in any case, always greater than twice that which results from the shorting of only one cell.

In conclusion, the shorting of any two cells causes in the secondary S of the transformer, a current which is at least twice that resulting from the shorting of only one cell. It is therefore only necessary to adjust the two amplifiers $a1$ and $a2$ so that they will energize relays $r1$ and $r2$ only in the case of the shorting of one and of two cells respectively. This adjustment is not critical because of the great difference in the corresponding secondary currents. The amplifiers $a1$ and $a2$ are such as to be able to support the important input overloads, which does not present any difficulties.

The magnetic circuit of transformer T is provided with an air-gap since it carries a flux having a D.C. component.

It is obvious that modifications may be made to the above described device without departing from the spirit of the invention.

I claim:

In a rectifier leg consisting of a plurality of rectifier cells in series whereby an inverse voltage balancing chain of equal resistances in series is connected in parallel with said rectifier leg, a device for detecting the shorting of respectively one or any two cells of the rectifier leg, comprising a transformer having separate primary windings wound in the same direction and respectively connected between the successive connecting points of the cells and the successive corresponding connecting points of said equal resistances, the number of turns of said primary windings increasing in arithmetical progression from the positive end of the leg to the other, said transformer including a supplementary winding having the same number of turns as that of the first winding but wound in opposite direction, a first diode in series with the connection of the last winding to the chain of resistances opposite to the current from this point, connections of said supplementary winding to the same points of the leg and of the chain of resistances where the last winding is connected, including in series a second diode conductive for the current from the connecting point to the chain of resistances, a secondary winding on said transformer, first signalling or protective means connected to said secondary winding, responsive to the shorting of one cell and second signalling or protective means connected to said secondary winding, responsive to the shorting of two cells.

References Cited by the Examiner

UNITED STATES PATENTS 3,018,417  1/62  Colaiaco et al. _____ 317—52
3,099,828  7/63  Kelley _____ 317—14 X SAMUEL BERNSTEIN, *Primary Examiner.*